United States Patent [19]

Tarutani et al.

[11] 4,439,402
[45] Mar. 27, 1984

[54] NUCLEAR FUEL CONVERSION SYSTEMS

[75] Inventors: Kohei Tarutani, Yokohama; Takeo Tamura, Mito; Hirofumi Oshima, Tokai, all of Japan

[73] Assignees: Tokyo Shibaura Denki Kabushiki Kaisha, Kanagawa; Doryokuro Kakunenryo Kaihatsu Jigyodan, Tokyo, both of Japan

[21] Appl. No.: 329,580

[22] Filed: Dec. 10, 1981

[30] Foreign Application Priority Data

Dec. 16, 1980 [JP] Japan .................. 55-177930

[51] Int. Cl.³ .................. B65G 53/60; B01D 35/02; G21F 9/08; B01J 19/12
[52] U.S. Cl. .................. 422/159; 252/643; 422/105; 422/119; 422/168; 422/186; 422/189; 423/251; 423/261
[58] Field of Search ............. 422/159, 186, 189, 168; 252/643; 423/251, 261

[56] References Cited

U.S. PATENT DOCUMENTS

| | | | |
|---|---|---|---|
| 2,868,707 | 1/1959 | Alter et al. | 252/643 |
| 3,041,136 | 6/1962 | Hedley et al. | 422/159 X |
| 3,287,279 | 11/1966 | Lyon | 252/643 |
| 3,725,293 | 4/1973 | Haas | 252/643 |
| 4,083,607 | 4/1978 | Mott | 423/261 X |
| 4,364,859 | 12/1982 | Ohtsuka et al. | 423/251 X |

FOREIGN PATENT DOCUMENTS

| | | | |
|---|---|---|---|
| 42-8120 | 4/1967 | Japan | 252/643 |
| 55-7527 | 1/1980 | Japan | . |
| 55-7528 | 1/1980 | Japan | 423/261 |
| 55-90424 | 7/1980 | Japan | 423/251 |
| 55-104926 | 8/1980 | Japan | 423/251 |
| 55-158133 | 12/1980 | Japan | 423/251 |

Primary Examiner—Barry S. Richman
Attorney, Agent, or Firm—Stevens, Davis, Miller & Mosher

[57] ABSTRACT

A nuclear fuel conversion system comprises a unit for heating and denitrifying a nitric acid solution of uranyl nitrate, plutonium nitrate, or mixture thereof, a unit for grinding denitrified products, a unit connected to the grinding unit through a first conveying unit for roasting and reducing ground products, a unit connected to the roast-reduction unit through a second conveying unit for further grinding and then sieving the roasted and reduced products, and a unit for disposing of waste gases and waste liquor. The denitrification unit includes a microwave generator for heating and denitrifying the nitric acid solution and for cooling the denitrified product, and the first and second conveying units comprise pneumatic carrier means each of which consists of a suction nozzle, cyclone connected to the nozzle through a pipe, and a blower for creating a reduced pressure condition in the pipe.

1 Claim, 1 Drawing Figure

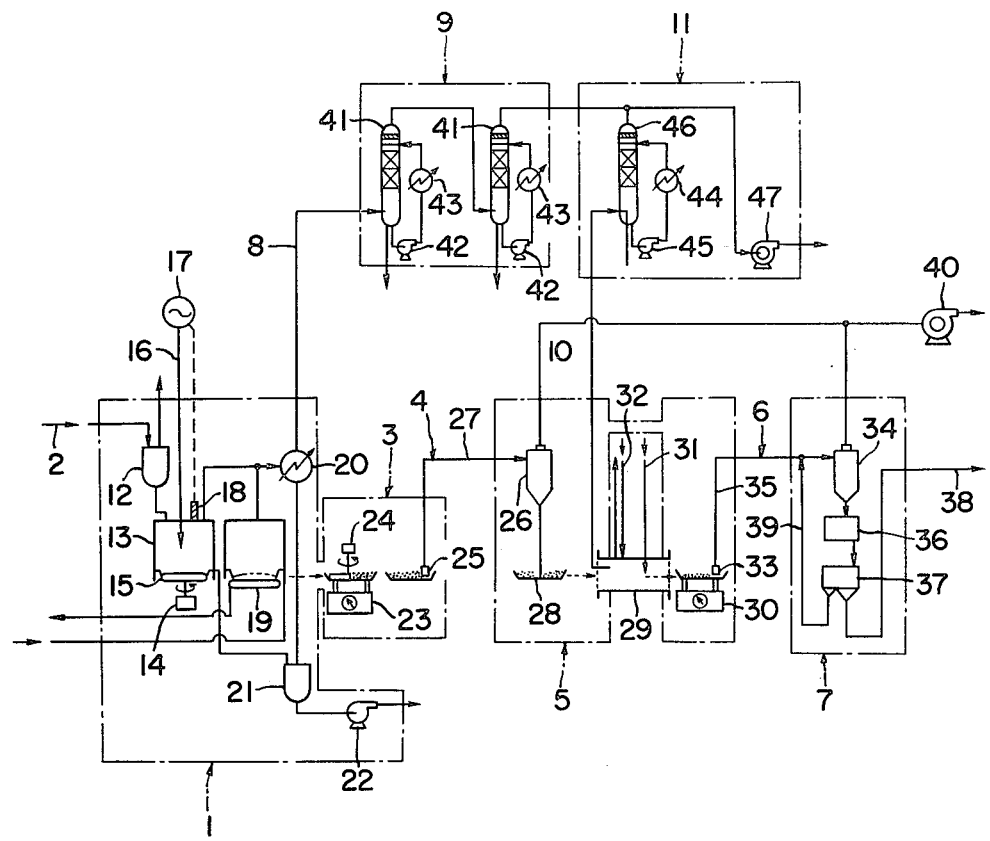

NUCLEAR FUEL CONVERSION SYSTEMS

BACKGROUND OF THE INVENTION

This invention relates to an improvement in a nuclear fuel conversion system for obtaining uranium dioxide, plutonium dioxide, or a mixture thereof from a nitric acid solution of uranyl nitrate, plutonium nitrate, or a mixture thereof.

A nuclear fuel conversion system of this type generally comprises a denitrification unit for denitrifying a nitric acid solution, a roast-reduction unit for roasting and reducing a denitrified product, a unit for grinding and sieving the roasted and reduced product, a waste disposal unit for disposing of waste gases and waste liquor exhausted from the units described above, and conveying means for conveying products produced by one unit to the succeeding unit.

However, in the nuclear fuel conversion system of the known type described above, the denitrification unit generally has a complicated construction which results in an inconvenience of maintenance or operation. This is because the denitrification unit utilizes a precipitation method and a sol-gel process as part of a complicated wet denitrification method and a method utilizing a fluidized bed as part of a thermal decomposition process for a dry denitrification method.

For example, in a conventional direct denitrification method utilizing a fluidized bed, in which a plutonium-uranium mixture solution is sprayed onto a fluidized bed, then roasted, and reduced, thereby to convert the solution to a dioxide, disadvantages occur in that the quality of the final product, dioxide, is not good the, waste gas contains nitrogen oxides (NOx), and a good decontamination factor (DF) of an impurity can not be expected.

An ammonia coprecipitation method of a known type in which ammonia is added to the plutonium-uranium mixture solution and the precipitate produced is filtered, dried, roasted and reduced so as to obtain a converted dioxide, includes such disadvantages as that the precipitate is not completely removed by the filtration, and a good DF is not expected so that the process as a whole is considerably complicated.

Moreover, a direct denitrification method utilizing microwave energy to heat a nitric acid solution in a denitrification process has been proposed. However, this denitrification method also has the disadvantages that the waste gas contains NOx and a good DF is not expected.

Furthermore, in the known methods or apparatus, intermediate products produced by the respective units of the nuclear fuel conversion system are conveyed by means of conveyers such as conveyor belts or by sealing them in containers, which complicates the conveying means and creates a fear of leaking or scattering of the products during transportion.

SUMMARY OF THE INVENTION

An object of this invention is to provide an improved nuclear fuel conversion system for obtaining converted products having uniform sizes and excellent qualities.

Another object of this invention is to provide a nuclear fuel conversion system having a simple denitrification unit which can be operated easily and maintained by utilizing a microwave generator.

A further object of this invention is to provide a nuclear fuel conversion system having improved conveying units which convey products produced in respective units in the system by utilizing pneumatic carrier means.

According to this invention there is provided a nuclear fuel conversion system of the type comprising a unit for heating and denitrifying a nitric acid solution of uranyl nitrate, plutonium nitrate, or a mixture thereof, a unit connected to the denitrification unit for grinding denitrified products, a unit connected to the grinding unit through a first conveying unit for roasting and reducing ground products, a unit connected to the roast-reduction unit through a second conveying unit for further grinding and then sieving roasted and reduced products, and a unit connected to the denitrification unit and the roast-reduction unit for disposing of waste gases and waste liquor therefrom, and the system is characterized in that the nitrification unit includes a microwave generator for heating and denitrifying the nitric acid solution and the first and second conveying units comprise pneumatic carrier assemblies.

BRIEF DESCRIPTION OF THE DRAWING

A single accompanying drawing shows a schematic diagram of a nuclear fuel conversion system according to this invention.

DESCRIPTION OF THE PREFERRED EMBODIMENTS

In the accompanying drawing, a nitric acid solution 2 is denitrified with heat in a denitrification unit 1 and on the downstream side of the denitrification unit 1 is located a grinding unit 3 for grinding denitrified products from the unit 1. A roast-reduction unit 5 for roasting and reducing the denitrified and ground products is connected to the grinding unit 3 through a conveyor unit 4 shown as pneumatic carrier means, and the roast-reduction unit 5 is connected through pneumatic carrier means 6 to a unit 7 which finely grinds and sieves the roasted and reduced products. A waste gas treating unit 9 is connected to the denitrification unit 1 through a pipe 8 and a waste liquor treating unit 11 is connected to the roast-reduction unit 5 through a pipe 10.

The denitrification unit 1 includes an intermediate tank 12 which temporarily stores a predetermined amount of the nitric acid solution 2 supplied thereto, and a heater 13 is connected to the tank 12 for facilitating the denitrification of the solution supplied from the tank 12. A denitrification boat 15 is positioned on the bottom of the heater 13 and the boat 15 can be rotated by rotating means 14 such as an electric motor. A microwave generator 17 is connected to the heater 13 through a waveguide 16, and on the top of the heater 13 is mounted an illumination meter 18 which operatively is connected to the microwave generator 17 and detects illuminance in the heater 13 thereby to generate a signal to stop the operation of the generator 17 when the illuminance reaches a predetermined level. A cooling device 19 is located adjacent to the heater 13 for cooling the denitrified products in the boat 15 after the denitrification. The denitrification unit 1 further includes a condenser 20 for condensing waste gas generated in the denitrification process, a condensate tank 21 for storing waste liquor, and a pump 22 operating to discharge the condensate.

The denitrified products which are solidified by the cooling device 19 are transferred together with the boat 15 to the unit 3 which comprises a weight meter 23 for measuring the weight of the solidified products and a grinder 24 for grinding the products to a particle size which permits the particles to be pneumatically carried by the conveying unit 4.

The conveyor unit 4 comprises pneumatic carrier means made up of a suction nozzle 25 and a carrier tube 27 which conveys the ground products to a cyclone 26 arranged in the roast-reduction unit 5 by pneumatic sucking action. The suction nozzle 25 can be moved vertically and horizontally by known driving means, not shown, so as to uniformly suck all of the whole products in the boat 15. The cyclone 26 collects the ground products and guides them into a boat 28 which can be moved bilaterally by suitable means, now shown, and a roast-reduction furnace 29 is located in a horizontally parallel position of the boat 28. A pipe 31 is disposed in the unit 5, one end of the pipe 31 being opened in the furnace 29 for supplying a hydrogen-nitrogen mixture gas to carry out the reduction reaction, and a pipe 32 is connected to the furnace 29 for supplying cooling water to cool the roasted and reduced products, i.e. dioxide of uranium or plutonium, for example. A measuring meter 30 is disposed near the furnace 29 for measuring the weight of the products.

The conveyor unit 6 comprises pneumatic carrier means made up of a suction nozzle 33 for sucking the reduced products and a carrier tube 35 which pneumatically conveys the ground products to a cyclone 34 located in the grinding-sieving unit 7, which comprises a grinder 36 connected to the cyclone 34 and a sieving device 37 connected to the grinder 36. The suction nozzle 33 can be moved vertically and horizontally by a known driving means so as to completely suck all of the whole powdery products in the boat 28. The grinder 36 acts to finely grind the products collected by a cyclone 34 into powdery products so that each particle of the products has a size smaller than a predetermined value and the sieving device 37, usually screening means, acts to sieve the powdery products in accordance with their sizes. The products separated by the sieving device 37 each having a size smaller than a predetermined value are transferred to a fuel regeneration plant, not shown, through a conveying pipe 38 and the powdery products each having a particle size larger than the predetermined value are returned to the cyclone 34 through a return pipe 39 and conveying pipe 35 be again ground by the grinder 36. The unit 9 for disposing of the waste gas from the denitrification unit 1 comprises two washing towers 41 interconnected in series, each being equipped with a pump 42 for circulating washing water and a cooler 43 for cooling the washing water. A washing tower 46 is located in the unit 11 for disposing of the waste gas from the roast-reduction unit 5 and is provided with a cooler 44 and a pump 45. Air blowers 40 and 47 are connected to the cyclones 26 and 34 and the washing towers 41 and 46, respectively.

The nuclear fuel conversion system according to this invention operates as follows.

The nitric acid solution 2 fed by a predetermined amount into the intermediate tank 12 is then supplied into the boat 15 located on the bottom of the heater 13. The boat 15 is rotated by the rotating means 14 and during this rotation, the nitric acid solution 2 is heated by the microwave energy from the microwave generator 17 through the waveguide 16 up to a time when the solution is vapourized, dried, and finally solidifies. After the completion of the denitrification reaction, a part of the denitrified products in the rotating boat 15 is ignited by local overheat. The resulting fire is detected by the illumination meter 18, thereby to stop the operation of the microwave generator 17. The rotation of the boat 15 is continued thereafter for a short time and the denitrified products in the boat 15 are then transferred together therewith onto the cooling device 19 by a conveyor and cooled there to a predetermined temperature.

After the cooling of the denitrified products has been completed, they are conveyed together with the boat 15 onto the weight meter 23 in the grinding unit 3 by means of a conveyor, now shown, to measure the weight of the products. The products in dried and solidified state are then ground by the grinder 24 to a size (1–2 mm in diameter) capable of being conveyed by the pneumatic carrier means.

The ground products are then guided into the cyclone 26 in the roast-reduction unit 5 through the conveying pipe 27 by the sucking action of the suction nozzle 25 which is operated by the air blower 40 which creates a reduced-pressure condition in the pipe 27. The products collected in the cyclone 26 are transferred into the boat 28 so as to be uniformly distributed therein by shaking the boat 28 bilaterally and the products in the boat 28 are then conveyed together therewith to a predetermined position in the roast-reduction furnace 29. The furnace is heated to a predetermined temperature, for example about 700° C. when uranium solution is treated, to roast the products while maintaining the predetermined temperature and the products thus roasted are then reduced in the furnace 29 by supplying hydrogen (5%)—nitrogen (95%) mixture gas through the supply pipe 31, whereby the roasted and reduced products are converted into a dioxide such as a uranium dioxide or plutonium dioxide.

After the roast-reduction process has been completed, the products, i.e. dioxide, are cooled by a cooling water supplied through the water supply pipe 32, and thereafter, the boat 28 is conveyed together with the products from the furnace 29 onto the weight meter 30 to measure the weight thereof.

The products on the meter 30 are guided into the cyclone 34 through the pneumatic conveying pipe 35 by the sucking action of the suction nozzle 33 created by the operation of the air blower 40 in creating a reduced pressure condition in the pipe 35.

The products collected in the cyclone 34 are further ground to become finer by the grinder 36 to obtain powdery products (50μ–100μ in powder diameter) which are then guided to the sieving device 37 to classify the powders according to their sizes. Powders each having a size smaller than that value are sieved and sent to the fuel regeneration plant through the pipe 38 and powders each having a size larger than that value are returned back to the grinder 36 through the return pipe 39 to be ground again. Thus, the dioxide products having uniform sizes can be obtained and supplied to the fuel regeneration plant.

During the processes and operations for obtaining finely ground dioxide products, waste gases generated in the denitrification unit 1 and the roast-reduction furnace 29 are guided to the washing towers 41 and 46 by the sucking action of the air blower 47. In the respective washing towers 41 and 46, the waste gases are washed by pure water circulating from water reservoirs located at the lower portions of the towers towards upper portions thereof and cleaned in contact with raschig-ring filled layers disposed in the towers. In such manner, nitrogen oxides (NOx) contained in the waste gases are absorbed and removed, and thereafter, the waste gases are transferred to a secondary waste gas treating unit, not shown, through the blower. The reaction heat generated by absorbing NOx is removed by the coolers 43 and 44 connected to the circulation loops of the washing water.

The waste liquor produced in the denitrification unit 1 is guided to a waste liquor treating unit, not shown, through the condensate tank 21 and the pump 22, and the waste liquor in the washing towers 41 and 46 are also guided to the waste liquor treating unit.

According to this invention, a nitric acid solution is heated and denitrified by utilizing microwave energy, so that operations and the system can be simplified in comparison with those of a known type method or system. Thus, the system is seldom out of order and can easily be maintained or inspected. Dioxide products finally obtained by conversion have substantially uniform sizes with excellent quality.

The products produced in the respective units of a nuclear fuel conversion system can easily be conveyed or transferred by using conveyor means which are pneumatically operated. This fact results in a considerably free and simple arrangement of the conveyor means, and it is not necessary to use any complicated mechanical conveyors or containers. In addition, there is no fear of scattering or leaking of the radioactive products during the conveying processes.

What is claimed is:

1. In a nuclear fuel conversion system of the type comprising a microwave generator unit for heating and denitrifying a nitric acid solution of uranyl nitrate, plutonium nitrate or a mixture thereof, means connected to said microwave generator heating and denitrifying unit for grinding denitrified products, means connected to said grinding means through a first conveying means for roasting and reducing ground products, means connected to said roasting and reducing means through a second conveying means for further grinding and sieving roasted and reduced products, and means connected to said microwave generator heating and denitrifying unit and said roasting and reducing means for disposing of waste gases and waste liquor therefrom, the improvement in which said microwave generator heating and denitrifying unit includes a cooling device for solidifying denitrified products and said first and second conveying means comprise pneumatic carrier means each of which comprises a suction nozzle, a cyclone for collecting products connected to said suction nozzle through a carrier pipe, and a blower connected to said cyclone through a carrier pipe for creating a reduced pressure condition in said carrier pipe.

* * * * *